(12) United States Patent
Majalahti

(10) Patent No.: US 7,029,412 B2
(45) Date of Patent: Apr. 18, 2006

(54) STEPLESS ELECTRO-MECHANICAL TRANSMISSION EQUIPMENT

(75) Inventor: Taimo Majalahti, Vilppula (FI)

(73) Assignee: Interbak LTD, Wilmington, DE (US)

( * ) Notice: Subject to any disclaimer, the term of this patent is extended or adjusted under 35 U.S.C. 154(b) by 82 days.

(21) Appl. No.: 10/486,798

(22) PCT Filed: Aug. 13, 2002

(86) PCT No.: PCT/FI02/00669

§ 371 (c)(1),
(2), (4) Date: Feb. 13, 2004

(87) PCT Pub. No.: WO03/016750

PCT Pub. Date: Feb. 27, 2003

(65) Prior Publication Data

US 2004/0242362 A1 Dec. 2, 2004

(30) Foreign Application Priority Data

Aug. 13, 2001 (FI) .................................. 20011633

(51) Int. Cl.
*F16H 3/72* (2006.01)
(52) U.S. Cl. .......................................... 475/5; 475/151
(58) Field of Classification Search .................... 475/5, 475/149, 151
See application file for complete search history.

(56) References Cited

U.S. PATENT DOCUMENTS

| | | | |
|---|---|---|---|
| 5,730,676 A | 3/1998 | Schmidt | |
| 5,935,035 A | 8/1999 | Schmidt | |
| 6,251,037 B1 | 6/2001 | Baumgaertner et al. | |
| 6,527,659 B1 * | 3/2003 | Klemen et al. | 475/5 |
| 2005/0137042 A1 * | 6/2005 | Schmidt et al. | 475/5 |

* cited by examiner

*Primary Examiner*—Sherry Estremsky
(74) *Attorney, Agent, or Firm*—Stites & Harbison; Douglas E. Jackson

(57) ABSTRACT

An electro-mechanical power transmission equipment, consisting of casing (3–3d) and inside the casing (3–3d) the power transfer arrangement having the power-in-axle (1) and the power-out axle (8), and between them an electricity generating and torque-transferring main generator arrangement (17,20,21,22) rotated by the axle (1), and an electric motor arrangement (29,30,31,31) that rotates axle (8), and the incoming rotational power is divided by the first planetary gear set (e.g.2b,4,5,6,7) between power-out axle (8) and the electric power transmission. For enhanced process of electric power transmission the main generator arrangement (17,20,21,22) is equipped with a special combination of speed up gearing (12,13,14,15) and optional clutches (10, 19/10,19b) which greatly increase the air gap velocity between the main generator's magnetic field producing elements (20,21), and that in the electric motor arrangement (29,30,31,32) the armature winding (32) and the rotor (30) are counter-revolving in relation to one another and between rotor (30) and power-out axle (8) is an additional, special reduction gear arrangement (24,25,26,27) transferring multiplied torque to the power-out axle (8) and that in the power transmission process all torques and counter-torques of both the generator arrangement (17,20,21,22) and the electric motor arrangement (29,30,31,32) are directed to rotate the power-out axle 8 in the intended direction of axle (8).

14 Claims, 1 Drawing Sheet

STEPLESS ELECTRO-MECHANICAL TRANSMISSION EQUIPMENT

Figure 1:
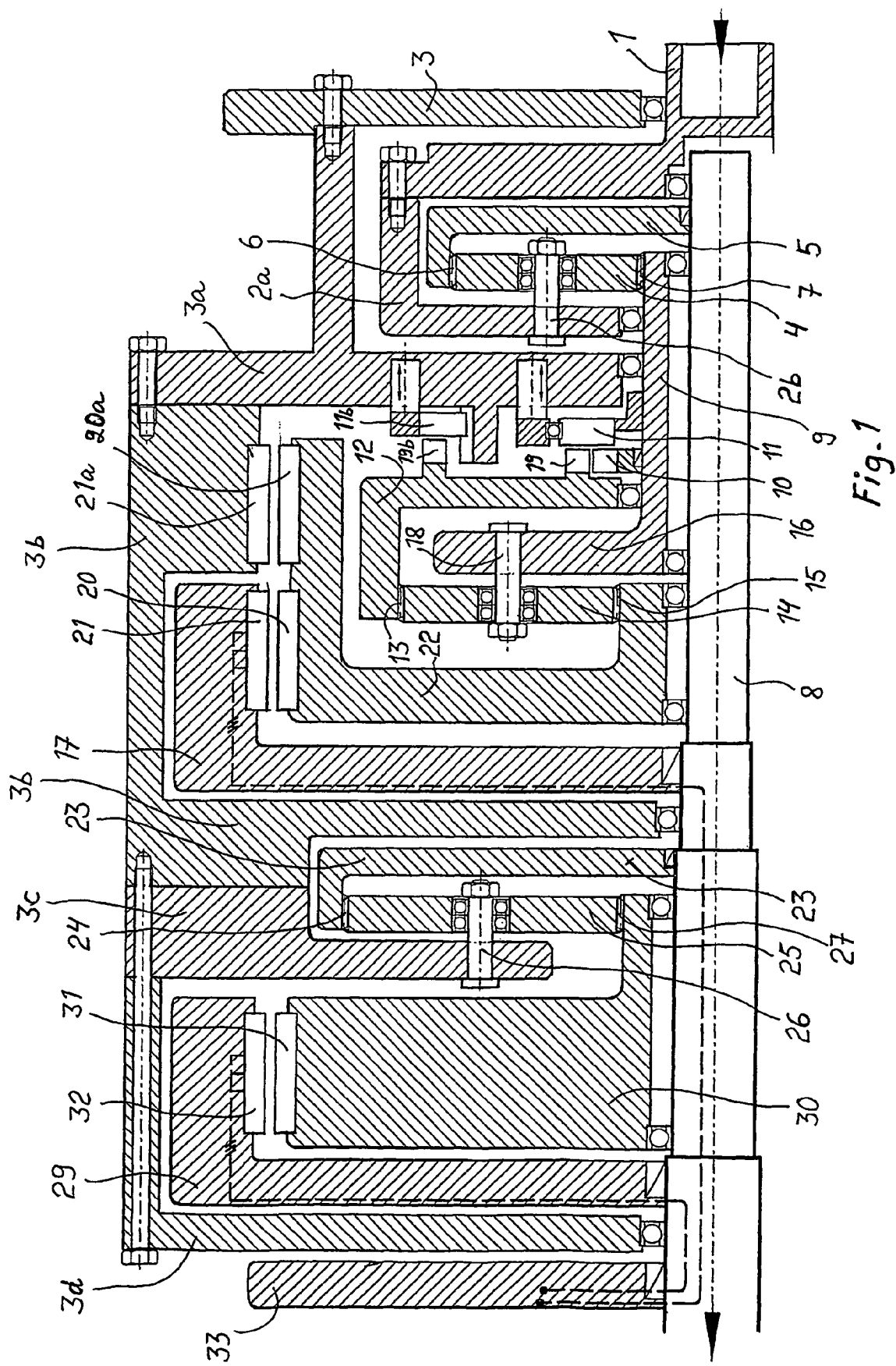

The invention relates to an electro-mechanical step-less transmission equipment, which includes a casing. Within the casing is a power transfer assembly including a power-in axle and a power-out axle, between which is a power transfer unit and with it an electricity generating and torque transferring generator arrangement and an electric motor arrangement which drives the power-out axle, and the incoming rotational torque is divided by a power-split arrangement preferably a planetary gear set between the power-out axle and the electric power transfer. This arrangement divides the incoming torque in a favorable manner so that only part of the mechanical power is transmitted via the electric system. Thus a high efficiency for the step-less power transmission is achieved. The construction also is much lighter and more fuel-efficient than traditional electrical transmission systems in which the whole transmitted power is driven through the electrical system.

Whatever known electric machine types may be used in the electro-mechanical transmission system e.g. synchronous machines, permanent magnet synchronous machines, induction machines, reluctance synchronous machines, switched reluctance machines, brush-less DC-machines etc.

Previously known from patent application FI-964025 is a gear in which incoming rotational power is divided into two parts by a power-split device such as a differential, where a great rotational speed but a small torque is divided to one and to the other a small rotational speed but a great torque. Both parts are eventually joined to drive the power-out axle. Gear ratio regulation is made with the part that carries the small torque. Regulation is achieved by breaking some of the axles by the means of a torque-braking generator. The power transfer ratio is controlled by extent of braking resistance. Braking energy is transformed into electricity, which is used by an electric motor to drive the power-out axle. But only in slower revolving phases of the power-out axle the generator is able to transfer direct torque to the power-out axle.

The drawback in this solution is that in higher rpm of the power-out axle the generator cannot transfer the advantageous direct magnetic drag-torque to the output axle. Also, at start-outs and in slow revolving speeds of power-out axle the electric motor cannot be used with the best efficiency because the air gap velocity between the coils and the magnets is relatively low since the windings of the electric motor are mounted to the stationary casing. Conduction of electricity from the revolving windings of the generator to the stationary coils of the electric motor also results in unnecessary loss in electricity transfer. The construction of the aforementioned rotational electro-mechanical parts becomes rather difficult if the magnets revolve slowly in relation to the coils and at the same time there is a high demand for power transfer by generating or using electricity.

The purpose of this new invention is to achieve a decisive improvement over the those limitations, whereby utilizing the principles of the electro-mechanical transmission equipment the construction of generators and electric motors become easier to realize and implement and they can run with higher speed. The full effect of braking electromagnetic counter-torque of the electricity producing generator is advantageously used to benefit the power transfer through all power transfer phases from the zero to the maximum rpm of the power-out axle, and at the same time all revolving and counter-revolving torques and energies of the electric motor are fully utilized to drive the power-out axle and heighten its torque. The exceptional counter-revolving design and construction of the electric motor of this invention offers the best possible conditions for effective use of electricity at all rotational speeds of the power-out axle.

The electricity is advantageously conducted between the revolving armature windings of the main generator and the electric motor via a revolving power electronic unit which is splice-coupled with the power-out axle and thus revolving with it. The rotating power electronic unit may perform all the tasks familiar e.g. to the present day vector control, direct torque control or scalar control frequency converters in the case of AC motors. The unit may also be adapted to control brush-less DC-machines, or switched reluctance machines etc.

What is shown in the patent claims is characteristic of this variable speed electro-mechanical transmission.

The advantage of the invention is that due to the special arrangement of the generator and the electric motor, the electrical regulation of the gear ratio can be fully achieved by electronic controls. At most power transfer phases the transmission's power-in axle can be driven at rpm, which is the best for the most economical fuel consumption of a power source/engine. Step-less alteration of rpm and high torque of the power-out axle are obtained with very high efficiency. Only specific parts of the generator and electric motor, namely their outer rotors with armature windings attached to the slower revolving power-out axle and the corresponding electric rotors sped by specific accelerating gear arrangements are revolving at higher speed compared to the armature. This fact makes the construction and adjusting of gear ratios simple and gives a powerful start-out torque to the power-out axle, even when starting out from its zero rpm.

Transmitting electricity between the rotating armature coils of the main generator and the rotating windings of the electric motor via a traditional, stationary frequency converter would result in unnecessary loss of electricity in electricity transmission. This electro-mechanical transmission's unique revolving power electronic unit is an optimal solution for the most advantageous electricity transmission mode between the main generator and the electric motor. However, in some cases slip-ring arrangements may be used to bring the generated power outside of the gear.

The remarkable advantage of this invention is that the power electronic unit, is splice-coupled with the same axle on which the rotors with attached electricity-generating and electricity-consuming armature windings are also attached with splice-coupling and are thus united by their common axle to revolve in unison together with one another. By this unique constructional feature a highly advantageous design of electricity transfer is arranged within the electro-mechanical transmission equipment.

A device according to this invention can also be utilized as a multi-functioned electro-motoric synchronization unit. With its assistance even the opposing rotations of the clutching elements of reverse and forward stages of an optional reverse gear arrangement (not shown in FIG. 1) can be synchronized before the said stages are locked into operation.

In the following, the invention is explained in detail according to the patent drawing, where FIG. 1. is viewed as a cut-open diagram, showcasing one possible application of the electro-mechanical transmission.

Explained from right to left, beginning at the power-in axle.

Construction

The axle of a power source is splice-coupled with the incoming axle 1. The incoming axle 1 is enlarging into a planet carrier 2, 2a, 2b for the first planetary gears 4. Axles 2b are attached to planet carrier flange 2a and planet gears 4 are carried in bearings by the axles 2b. (Note: All of this Electro-Mechanical Transmission's planetary gear axles can either be integral parts of the planetary carriers, or they can be attached components to the planetary carriers).

Planet gears 4 are meshed with ring gear 6. Ring gear 6 is attached to flange 5, which is splice-coupled with power-out axle 8. Planet gears 4 are also meshed with sun gear 7, which is an integral part of sleeve axle 9 and flange 16. The axles 18 are attached to flange 16. Second planetary gear set is formed of parts 12, 13, 14, 15 and 18. Planetary gears 14 are carried in bearings by axles 18.

Internal clutching parts can be used for example in the following way. The clutch part 10 is splice-coupled with the sleeve-axle 9. The corresponding clutch part 19 is attached to the flange 12. By moving the clutching part 11 the parts 10 and 19 can be locked together causing the flange/ring gear combination 12,13 to rotate together with the sleeve axle 9.

The second clutch 11b, 19b is placed between the stationary casing-part 3b and the flange 12. By locking this clutch 11b, 19b by moving the part 11b to the left the ring gear/flange combination 13, 12 is locked stationary.

The main generator's armature windings 21 are attached to the inner surface of the outer rotor 17. The outer rotor 17 is splice-coupled with the axle 8. In the case of a permanent magnet synchronous generator the magnets 20 are attached to outer surface of the generator's inner rotor 22. The generator may, however be of almost any known rotating electric machine type. In the case of an inducton generator the part 20 means the rotor winding. The inner rotor 22 is carried in bearings by the axle 8.

The active parts of the electric motor are 31 and 32. The inner rotor 30 is carried in bearings by the axle 8 and the rotor windings or magnets 31 are attached to the outer surface of the said inner rotor 30.

The motor may be of a fast revolving type and in this case even a solid rotor induction motor may be used. Using a high speed motor is advantageous since smaller size may be achieved. The armature windings 32 are mounted to the outer rotor 29. The outer rotor 29 is splice-coupled with the power-out axle 8.

The third planetary gear set is formed of parts 23, 24, 25, 26 and 27. The axles 26 are attached to the stationary casing-flange 3c. The planet gears 25 are carried in bearings by the axles 26.

Electricity is conducted from the main generator's armature windings 21 to the electric motor's armature windings 32 via a power electronic unit 33, which is splice-coupled with the power-out axle 8, and is thus revolving at the same speed together with the main generator's outer rotor 17 and the electric motor's outer rotor 29. The wiring from the windings 21 leading to the power electronic unit 33 and from it to the windings 32 is led by the route of a drilled center-hole of the power-out axle 8 or in machined grooves along the surface of the power-out axle 8.

The electro-mechanical transmission is equipped with an additional generator/electric motor 20a, 21a with the windings 21a attached to the stationary casing 3b and the magnets 20a anchored in the revolving inner rotor 22. With the axle 1 locked stationary the additional generator 20a, 21a can be utilized to electrically drive the power-out axle 8 forward and in reverse. The other uses the additional generator 20a, 21a can be used are regenerative braking, electro-motoric synchronization, as a starter-motor of the powering engine and for other electricity needs outside the transmission.

The rotating components of the electro-mechanical transmission are carried in bearings by the casing-flanges 3, 3a, 3b and 3d. The bearings used in the invention are preferably ball bearings. The electrical wiring from the windings 21a is led through casing 3b.

Principles of Function of the Electro Mechanical Transmission

Notice that when rotational direction is referred to in this explanation, whether clockwise or counter-clockwise this electro-mechanical transmission is observed from the power source's side (from the right).

"Clutch-free" Phase

The clutch-free phase is always "on" when no torque is directed to the power out axle 8 by the electro-mechanical transmission. In clutch-free phase, one of the clutches 10, 19 or 11b, 19b can be open (at least one of them must be unlocked). Axle 8 is not locked in any way, and it can revolve or remain stationary. Also, when the generators are not generating electricity and the electric motor is not using electricity, this Electro-Mechanical Transmission is in the "clutch-free" phase.

When the incoming axle 1 is rotated clockwise by the power source, the first planetary gear (with its parts 4, 5, 6, 7) drives the sleeve-axle 9 and the flange 16 to revolve clockwise, but with higher rpm than axle 1.

Clutch 10, 19 Locked

When clutch 10, 19 is locked, the entire second planetary gear set, formed of parts 12,13, 14,15, 16 and 18) along with the outer rotor 17, revolves as one unit, the parts locked to one another. In this clutch-10, 19-engaged-phase the second planetary gear set does not accelerate the rotational speed of the inner rotor 22.

Clutch 11b, 19b Locked

When the clutch 10, 19 is released and the second clutch 11b, 19b is locked, the second planetary gear set 12,13,14,15 operates as a step-up gear to the generator's inner rotor 22 increasing its clockwise rotation over the speed set by the first planetary gear set 2b,4,5,6,7

Starting Power Transmission When the Power-out Axle 8 Is Not Yet Revolving.

While the inner rotor 22 revolves clockwise at a suitable speed electricity may be generated. In the case of a permanent magnet synchronous generator the electromotive force is directly proportional to the speed difference of the outer and the inner rotors. In the case of an induction generator, controlled magnetizing current is conducted to windings 21 causing electricity-generating magnetic flux between the windings 21 and the rotor windings 20. Despite of the generator or the motor type the electricity-generation and braking counter-torque of the main generator 20, 21 are indirectly controlled by the functions of the power electronic unit 33 by controlling the motor torque. The electromagnetic counter-torque of the electricity producing main generator 20, 21 attempts to slow down the movement between the windings 21 and the rotor 20. Thus, whenever electricity is generated by the main generator's magnets 20 and windings 21, the outer rotor 17 and the power-out axle 8 are affected by the magnitude of the "drag-force" of the magnetic flux of the said main generator 20, 21 to revolve in the same direction with the inner rotor 22.

Simultaneously, the generator's inner rotor 22 is also affected by the same electro-magnetic braking counter-torque which is demanding corresponding power-draw from the engine/power source. The first planetary gear set 2a, 2b, 4, 6, 7 operates as a divider between the fast revolving, light torque power rotating the inner rotor 22 and the slower revolving, heavier torque power rotating directly the power-out axle 8 via the power-split's flange 5. Thus, a remarkable part of the power of the engine/power source, as determined by the electro magnetic torque between the main generator's windings 21 and magnets 20, is transmitted by the flange 5 of the first planetary gear set 2a, 2b, 4, 6, 7 as direct mechanical rotating torque to the power-out axle 8.

Also at the same time, the electricity produced by the main generator 20, 21 is transferred from the windings 21 by electrical wiring led by the route of a center-hole of the power-out axle or via machined grooves along the power-out axle 8 to the power electronic unit 33 and from it to the electric motor windings 32 causing magnetic flux between the windings 32 and the magnets 31. This electromagnetic flux rotates with electro motoric force the electric motor's electricity utilizing elements 31 and 32 so that inner rotor 30 rotates counter-clockwise and the outer rotor 29 rotates clockwise. The inner rotor's 30 counter-clockwise rotational torque is multiplied by the reducing third planetary gear set 23, 24, 25, 26, 27 to revolve the axle 8 clockwise because the carrier 3c is locked to frame. The outer rotor 29 drives directly the power-out axle 8 clockwise. Note! The Electro-Mechanical Transmission's main generator 20, 21 is utilized at the same time in three different ways:

1. To generate electricity for the electric motor to increase the torque of the power-out axle 8.
2. Simultaneously, the power-out axle 8 is directly rotated via the outer rotor 17 by the electromagnetic "drag torque" of the main generator 20,21.
3. At the same time the main generator's 20, 21 electro-magnetic counter-torque is also affecting the inner rotor 22 with the braking electro-magnetic counter-torque.

The intensity of this counter-torque determines how much of the power rotating the axle 1 is divided by the power-split 2b, 4, 6, 7, 5 to mechanically rotate the power-out axle 8.

As described above, the electro-magnetic torques and counter-torques are transferred to power-out axle 8 by four different parts:

1. The power-split's flange 5 rotates directly the power-out axle 8.
2. The generator's outer rotor 17 rotates axle 8 directly.
3. The electric motor's windings 31 rotate the axle 8 with multiplied torque via the flange 23 of the reducing gear arrangement 24, 25, 26, 27.
4. The electric motor's outer rotor 29 rotates directly the axle 8.

The solely mechanical torque to the axle 8 conveyed by the parts 5 and 17 entirely bypasses both the power electronic unit 33 and the electric motor 31, 32. Thus this mechanically conveyed rotational power correspondingly reduces the portion of electrically conveyed power which is processed by the power electronic unit 33 and consumed by the electric motor 31, 32. For example, when the power-out axle 8 achieves the same rpm as the incoming axle 1, the out-coming, mechanically relayed rotational energy of this electro-mechanical transmission is approximately ⅔ of the power source's energy momentarily in use and only ⅓ is conducted by the power electronic unit 33 and the electric motor 31, 32.

Control signals to the revolving power electronic unit unit 33 are transferred wirelessly by optical signals, infra-red signals, radio waves, or by electro-magnetism.

Use of the Electro-Mechanical Transmission Equipment's Mechanical Clutches

At the power transfer phase when the axle 1 revolves at high speed and the axle 8 does not yet rotate or rotates slowly, excessively high rpm of the inner rotor 22 can be prevented by locking the clutch 10, 19. The whole second planetary gear set 12, 13, 14, 15 revolves as one unit in this "clutch 10, 19 locked-clutch 11b, 19b unlocked" phase and does not increase the inner rotor's 22 clockwise rotation.

As the rotation of the power-out axle 8 increases and the rotation of the inner rotor 22 correspondingly decreases, the clutch 11b, 19b is locked and simultaneously the clutch 10, 19 is unlocked. By so doing, the inner rotor's 22 clockwise rotation is increased so that the main generator's 20, 21 air gap velocity, electricity output and electro-magnetic counter-torque are sufficient for effective power transfer in higher rotation phases of the power-out axle 8, also.

The Electro-Mechanical Transmission as an Electro-Motoric Synchronization Device When used as an electro-motoric synchronization device in accelerating gear change of the second planetary gear set 12, 13, 14, 15 the electro-mechanical transmission must be connected to an accumulator, or capacitors or to some other external source of electricity.

The speed differences between the phases of the clutches 10, 19 and 11b, 19b are considerable. It would be hard to equalize the greatly differing speeds of the clutch parts 10, 19 or 11b, 19b to be locked together by using the traditional synchronizing methods. By utilizing the electro-mechanical transmission as an electro-motoric synchronization device, equalization of rpm between the slow/fast phases of the second planetary gear set 12, 13, 14, 15 can be done without difficulty. Synchronization is attained by electronically controlling the rotation of the ring gear/flange combination 13, 12 through the power train, formed of an additional generator/electric motor's 20a, 21a, magnets 20a, the sun gear/inner rotor combination 15, 22 on which the magnets 20a are anchored in and the planet gears 14, for clutching to be done in equalized speeds between the said clutches 10, 19 or 11b, 19b. Gearshifts can be done at synchronized speed levels.

Synchronizing in Step-up Gear Change, When the Inner Rotor's 22 Clockwise Rotation Is Accelerated:

At the gear change, accelerating from locked clutch 10, 19 phase to clutch 11b, 19b locked phase, the electro-mechanical transmission is used as a synchronizing device by momentarily disconnecting the electricity-generation of the windings 21 and both of the clutches 10, 19, and 11b, 19b are disengaged. Simultaneously the additional generator/electric motor's 20a, 21a windings 21a receive electricity from an accumulator, capacitors or some other source of electricity. The additional generator/electric motor 20a, 21a, functioning as an electric motor, very quickly increases the inner rotor's 22 clockwise rotation until the ring gear/flange combination 13, 12 stops revolving in relation to the stationary casing-flange 3a. At fully equalized speed levels the clutch 11b, 19b is locked up.

The electricity to the windings 21a is disconnected and the electricity-generation by the windings 21 is resumed for continuance of effective power transmission even at faster rpm phase of the power-out axle 8.

In the clutch 10, 19 opened-clutch 11b, 19b locked phase, the full accelerating ratio of the second planetary gear set 12, 13, 14, 15 speeds up the clockwise rotation of the inner rotor 22.

Note! During gear shifting electricity can be conducted to the electric motor's 31, 32 coil 32 via slip rings (not shown in the FIG. 1.) that are connected to the power electronic unit 33, and thus the constant drive of the power-out axle 8 can be maintained while the gears are being shifted.

Synchronizing in Down Gearing, When Due to Speed Difference of Axles 1 and 8 the Inner Rotor 22 Is Revolving With Excessively High Speed:

Both clutches 10, 19 and 11b, 19b are disengaged. The polarity of the additional generator/electric motor 20a, 21a is switched to generator position. The additional generator/electric motor 20a, 21a functioning as a generator quickly slows down the inner rotor 22 and with it the whole second planetary gear set 12, 13, 14, 15 until the ring gear/flange combination 13, 12 slows down to the same speed with the sleeve axle 9. Now, at fully synchronized rpm levels, the clutch 10, 19 is engaged. Electricity-generation by the additional generator/electric motor 20a, 21a is discontinued and electricity-generation by the main generator 20, 21 is resumed. The function of the electro-mechanical transmission's power transmission is continued with reduced speed of rotation of the inner rotor 22.

CENTRAL PRINCIPLE: The placement of the acceleration gear in the gearing configuration. (Second gear=latter accelerator) It is especially necessary that the accelerator is correctly placed in the power chain in order to gain the highest possible solely mechanical torque to the power-out axle 8 at all rotational speeds.

It is advantageous that the full output of power source/engine is transferred by the first planetary gear set 4, 5, 6, 7 which serves as power-split for all the rotational power entering into the Electro-Mechanical Transmission by the axle 1. By the power-split a part of the incoming power is divided to rotate the generator's inner rotor 22. The other part of the incoming power is conducted by the power-split's ring gear/flange combination 6, 5 to transfer mechanical counter-clockwise torque to the power-out axle 8. The faster is the rotation of the axle 8 compared to that of the axle 1 the greater is the solely mechanical torque and power conveyed by the power-split's 2a, 2b, 4, 5, 6, 7 flange 5 to the power-out axle 8.

When the accelerator 12, 13, 14, 15 is placed between the power divider 4, 5, 6, 7 and the inner rotor 22, the speed up effect of the accelerator 12, 13, 14, 15 does not lessen the mechanical power flow to the axle 8, since the rpm of axle 1 is not increased by the rightly placed accelerator 12,13, 14,15 and the speed ratios of axle 1 and axle 8 in relation to one another remain advantageous for increased mechanical power directly transferred to the output axle 8.

As the power-out axle 8 is rotated clockwise yet faster, this electro-mechanical transmission's mechanically transmitted direct rotational power conveyed by both the main generator's 20, 21 outer rotor 17 and the power split's 4,5,6,7 flange 5 to the axle 8 can, in actual power transmission, increase up to about ¾ of the rotating power entered by the power-in axle 1. In this stage of power transmission only ¼ of the power source/engine's output presently in use is transmitted by the counter-rotating electric motor 31, 32

Rotating the Power-out Axle 8 Counter-clockwise (Reverse Gear)

When the engine is not running and its rotation is locked by a braking device (not shown in FIG. 1.) the power-out axle 8 of the this Transmission can be electrically rotated forward or reverse by the additional generator/electric motor 20a, 21a functioning as an electric motor, which is connected to a battery or some other source of electricity. Clockwise rotation of the power-out axle 8 of the electro-mechanical transmission equipment can also be reversed by a separate, reverse gear set (not shown in FIG. 1.), which is placed between the power source/engine and the power-in axle 1 or after the transmission.

If a reverse gear arrangement is placed between the power source/engine and power-in axle 1, the transmission can be used as an electro-motoric synchronizing device to equalize even the very large rpm differences of the forward and reverse stages of the power-out axle 8.

When Changing from Clockwise Rotation Stage of the Power-out axle 8 to Its to Reverse Stage.

The power source/engine's rpm is lowered to idle and the reverse gear arrangement's (not shown in FIG. 1) forward stage is disengaged. The clutch 10, 19 remains engaged. Electricity is conducted to the windings 21a. Functioning as an electric motor the additional generator/electric motor 20a, 21a quickly rotates counter-clockwise the inner rotor 22, and via the first planetary gear set 4, 5, 6, 7 the axle 1, until the synchronized speed levels are reached which enable the reverse stage of the power-out axle 8 to be engaged. At fully equalized speed of the reverse gear set the power-out axle's 8 counter-clockwise rotation stage is locked in. Electricity to the windings 21a is switched off. All of the electro-mechanical transmission's rotational parts and components reverse rotation in this stage. Note! The power-out axle 8 may still slowly rotate clockwise when change to reverse stage is taking place.

Changing from the Reverse Gear Arrangement's Reverse Stage to Forward Stage.

The power source/engine rpm is reduced to idling and the reverse gear arrangement's reverse stage is disengaged. The clutch 10, 19 remains locked and the clutch 11b, 19b stays open. Electricity is conducted to the windings 21a. Functioning as an electric motor the additional generator/electric motor 20a, 21a quickly turns the inner rotor's counter-clockwise rotation to clockwise. Via the first planetary gear set 4, 5, 6, 7 the inner rotor 22 rotates the axle 1 clockwise until the rotation level of the reverse gear set's forward stage is reached.

Now, at fully synchronized speeds of the clockwise stage of the reverse gear arrangement the power-out axle's 8 clockwise rotating stage is locked in. The power transmission in the clockwise rotation of the power-out axle 8 may normally continue. Note! The power-out axle 8 may still slowly rotate counter-clockwise when change to forward stage is taking place.

Regenerative Braking or Whenever the Power-out Axle 8 Is Rotating the Revolving Components of the Electro-Mechanical Transmission Faster Than the Power Source/Engine:

The electricity generation of the main generator 20, 21 and the electric motor's 31, 32 electricity-consumption are switched off. The additional generator/electric motor 20a, 21a is switched to generation. When the additional generator 20a, 21a is generating electricity the rotation of the inner rotor 22 is braked and slowed by the electromagnetic counter-torque. Through the power-split 4, 5, 6, 7 that slowing-down effect is correspondingly braking the rotation of the power-in axle 8. The generated electricity is stored in an accumulator or in capacitors or it can be consumed by electrical heating elements.

By the power-split 4, 2a, 2b, 5, 6, 7 the rotating power of the torque to be braked and slowed down is divided between the power source/engine and the counter-torque of the magnetic flux of the electricity-generating elements 20a, 21a Braking power is determined by the electronically controlled intensity of the said electricity-generating electromagnetic flux of the said additional generator 20a, 21a.

Utilizing the Electro-Mechanical Transmission as the Power Source-engine's Starter Motor.

The brakes of the vehicle are applied so that the power-out axle 8 is held stationary. One of the clutches 11b,19b or 10,19 is engaged and the additional generator/electric motor 20a, 21a, receiving electricity from a accumulator or capacitors or some other outside source of electricity, functions as a electric motor rotating the inner rotor 22 in desired direction. Through the second and first planetary gear sets 15, 14, 12 and 7, 4, 6, 5 the additional generator/electric motor 20a, 21a effectively rotates the said engine to start it running. Immediately after the engine has started, electricity to the additional generator is disconnected, and the power transmission may be commenced by the electro-mechanical transmission equipment.

Utilizing the Electro-Mechanical Transmission as an Alternator in Motorized Vehicle or as a Generating Device for Other Outside Electricity Requirements.

While the transmission is transmitting rotating power to the power-out axle 8, the additional generator/electric motor 20a, 21a functioning as an alternator may charge an accumulator or capacitors. Electricity, generated by the additional generator 20a, 21a, is conducted by wiring through the casing-part 3b via a stationary rectifier to an accumulator or capacitors (not shown in FIG. 1.) to be utilized in the motor vehicle's various electricity needs.

When the vehicle, equipped with the electro-mechanical transmission, is parked with the engine running with suitable rpm and the power-out axle 8 locked stationary, by utilizing additional generator 20a, 21a to generate electricity, the electro-mechanical transmission can be used in similar way as a stand by power plant for many kinds of outside electricity needs.

The power-out axle 8 is locked stationary by a separate locking device (not shown in FIG. 1). The electricity-generating magnetic flux is caused between the windings 21a mounted on the casing-part 3b and the magnets 20a, which are rotated fast by the inner rotor 22. Generated electricity is conducted by the wiring through the casing-part 3b to various outside points of electricity requirements. Notice. When a vehicle equipped with the electro-mechanical transmission according to this invention, is utilized as a stand-by power plant, electricity can be generated, if so needed, with nearly the fill output of the power source/engine. If slip rings are used to take out the electricity generated by the main generator then the auxiliary generator can be left out altogether and the main generator can perform all the the auxiliary generator's functions described above.

The invention claimed is:

1. An electro-mechanical power transmission equipment, comprising:
   a casing,
   a power transfer arrangement inside the casing and having
      a power-in axle and a power-out axle, and
      between the power-in axle and the power-out axle,
         a) an electricity generating and torque-transferring main generator arrangement rotated by the power-in axle, and
         b) an electric motor arrangement that rotates the power-out axle,
   wherein incoming rotational power of the power-in axle is divided by a first planetary gear set between the power-out axle and the main generator arrangement,
   wherein, for enhanced electricity generation, the main generator arrangement is equipped with a combination of speed up gearing and first and second clutches, which combination greatly increases an air gap velocity between magnetic field producing elements of the main generator arrangement,
   wherein, the electric motor arrangement, an armature winding and a rotor thereof are counter-revolving in relation to one another, and between the rotor and the power-out axle there is reduction gear arrangement transferring multiplied torque to the power-out axle, and
   wherein, in a power transmission process, all torques and counter-torques of both the main generator arrangement and the electric motor arrangement are directed to rotate the power-out axle in an intended direction of the power-out axle.

2. An electro-mechanical transmission equipment according to claim 1, wherein both the electricity generation of the main generator arrangement and the direct torque transferred to the power-out axle by the magnetic field producing elements is controlled by electronically regulated intensity of an electricity-generating magnetic flux of the main generator arrangement.

3. An electro-mechanical transmission equipment according to claim 1, wherein a speed and torque of the electric motor arrangement are electronically controlled.

4. An electro-mechanical transmission equipment according to claim 1, wherein a revolving electric machine power electronic converter for regulation of the main generator arrangement and the electric motor arrangement is firmly fixed with the power-out axle and is revolving with the power-out axle.

5. An electro-mechanical transmission equipment according to claim 1;
   wherein, after the incoming rotational power is divided by the first planetary gear set toward the main generator arrangement, the main generator arrangement includes rotating parts and between the rotating parts there is the first clutch, and
   wherein, in the engaged position of the first clutch, the speed up gearing is not transferring accelerating rotation to an inner rotor of the main generator arrangement.

6. An electro-mechanical transmission equipment according to claim 1;
   wherein, after the first planetary gear set the second clutch is placed between a stationary casing-part of the casing and a rotating part of the main generator arrangement, and
   wherein, in a locked position of the second clutch, the speed up gearing is accelerating the rotation of an inner rotor of the main generator arrangement.

7. An electro-mechanical transmission equipment according to claim 1, wherein synchronized speeds between the first and second clutches is obtained by electronically controlling a rotation of clutch elements of the first and second clutches.

8. An electro-mechanical transmission equipment according to claim 1, wherein a no-load phase of the power-out axle is attained by controllable power electronics producing a no-load situation for both the electric motor arrangement and the main generator arrangement.

9. An electro-mechanical transmission equipment according to claim 1, wherein the electric motor arrangement or/and the main generator arrangement are used to produce a propulsion force to the power-out axle.

10. An electro-mechanical transmission equipment according to claim 1 wherein the power-in axle and the main generator arrangement are utilized as a stand-by power plant.

11. An electro-mechanical transmission equipment according to claim 1, wherein the main generator arrangement, the electric motor arrangement and a power electronic unit are placed one after another on one of the power-in axle or power outer axle, and wherein the casing is cylindrical.

12. An electro-mechanical transmission equipment according to claim 1, wherein windings of the main generator arrangement, the armature windings of the electric motor arrangement, and a power electronic unit are firmly fixed with the power-out axle and hence are revolving in unison together with one another.

13. An electro-mechanical transmission equipment according to claim 1, wherein electrical wiring is provided from a main generator armature windings to a power electronic unit and from the power electronic unit to the armature windings of the electric motor arrangement, and wherein the electrical wiring is led by a route of one of (a) a drilled center-hole of the power-out axle or (b) machined grooves along a surface of the power-out axle.

14. An electro-mechanical transmission equipment according to claim 1, wherein control signals to a revolving power electronic unit are transferred by one of optical signals, infra-red signals, radio waves, or electro-magnetism.

* * * * *